United States Patent [19]

Maag et al.

[11] Patent Number: 5,510,198
[45] Date of Patent: Apr. 23, 1996

[54] RE-USABLE CEMENT FORMS

[75] Inventors: William D. Maag; Joey C. Carico, both of Kingsport, Tenn.

[73] Assignee: Eastman Chemical Company, Kingsport, Tenn.

[21] Appl. No.: 392,455

[22] Filed: Feb. 22, 1995

[51] Int. Cl.$^6$ ....................... B32B 9/00
[52] U.S. Cl. ............ 428/688; 428/240; 428/286; 428/302; 428/327; 428/404; 428/479.6; 428/481; 428/483; 428/496; 428/523; 428/537.5; 428/703; 528/272; 156/42; 156/44; 156/45
[58] Field of Search ............... 428/302, 286, 428/523, 703, 240, 327, 481, 479.6, 483, 490, 496, 537.5, 404, 688; 156/42, 44, 45; 528/309, 272

[56] References Cited

U.S. PATENT DOCUMENTS 4,352,925  10/1982  Petke et al. ................... 63/18

FOREIGN PATENT DOCUMENTS 918896  1/1973  Canada .................... 117/207
931486  8/1973  Canada .................... 154/95

Primary Examiner—Patrick J. Ryan
Assistant Examiner—Abraham Bahta
Attorney, Agent, or Firm—Betty J. Boshears; Harry J. Gwinnell

[57] ABSTRACT

This invention relates to a panel of material comprising a film comprising a layer of a solid polyolefin and a layer of copolyester wherein said copolyester comprises:

(1) a dicarboxylic acid component comprising repeat units from at least 90 mole percent terephthalic acid; and (2) a diol component comprising repeat units from 20 to 40 mole percent diethylene glycol and 80 to 60 mole percent ethylene glycol, based on 100 mole percent dicarboxylic acid and 100 mole percent diol, said layer of a copolyester being intimately bonded to a wooden substrate and said polyolefin layer being exposed on the outer surface of said film.

15 Claims, No Drawings

5,510,198

RE-USABLE CEMENT FORMS

FIELD OF THE INVENTION

This invention relates to thermoplastic films laminated to wood fiber boards or panels for use as re-usable cement forms.

BACKGROUND OF THE INVENTION

It is common in the industry to use plywood to construct forms in which to pour cement to allow for setting and curing into very specific shapes and dimensions.

In the concrete industry, it is desirable that the form boards which are used to mold the concrete until it has set, exhibit certain characteristics as follows: adhesion of the laminate to the board, ease of release of cement from the form, and durability of the laminate. If damage were to result to the finish of the concrete, it might become necessary to refinish the cement surface. This is a task which requires additional materials and time-consuming labor. If the form board is damaged significantly, it cannot be re-used.

There are different methods in the art on how to provide improved, re-usable form boards. However, ordinary plywood, usually treated on the surface with paraffin oil or in other ways and with a variety of mold release agents, is still being used most frequently. More sophisticated concrete form boards may be made by treating fir plywood with a penetrating coating of an epoxy resin followed by a polyurethane coating. These two coatings are fused and cured under thermosetting conditions. The epoxy/urethane resin coatings are, however, difficult to apply and still require the application of a release agent.

Alternatively, a phenolic resin impregnated paper overlay may be bonded to one side of a plywood panel. This overlay allegedly tends to bridge the gaps and cracks which would normally occur and have reasonably low water penetration.

Another alternative is to laminate a polyolefin film to the surface of the panel as disclosed in CA 919,896 and CA 931,486. However, the adhesion of the polyolefin to the panel is not good. Therefore, it is necessary to apply a primer to the panel before laminating the polyolefin to the primed surface to increase the adhesion properties. This is a long, difficult process.

The home construction industry commonly uses softwood plywood coated with release agents such as mineral oil for these cement forms. The disadvantage of this method is that the forms can generally only be re-used once or twice.

U.S. Pat. No. 4,352,925 discloses the use of copolyester compositions as heat-resistant adhesive compositions for use on various types of paper, paperboard, plastic, leather, metal, wood, ceramics, etc. However, it does not show the use of the copolyester compositions in a film comprising a polyolefin layer and a copolyester layer as does the present invention.

It would be advantageous to have more durable cement forms which exhibit excellent release properties and excellent resistance to delamination, since the commercial and industrial construction industries prefer to get many uses out of each set of cement forms for economic and convenience purposes.

It also would be advantageous to have a film used to produce cement forms wherein film can be applied to a wooden substrate without the necessity of applying a primer to the substrate before the application of the film.

SUMMARY OF THE INVENTION

According to the present invention, there is provided a panel of material comprising a film comprising a layer of a solid polyolefin and a layer of a copolyester wherein the copolyester comprises:

(1) a dicarboxylic acid component comprising repeat units from at least 90 mole percent terephthalic acid; and (2) a diol component comprising repeat units from 20 to 40 mole percent diethylene glycol and 80 to 60 mole percent ethylene glycol, based on 100 mole percent dicarboxylic acid and 100 mole percent diol, the layer of the copolyester being intimately bonded to a wooden substrate and the polyolefin layer being exposed on the outer surface of said film.

Also, according to the present invention, there is provided a method for the formation of a concrete structure comprising the steps of erecting and securing a form for the structure, the form consisting essentially of wooden panels coated with a film, preferably coextruded, comprising a layer of a solid polyolefin and a layer of a copolyester as described above wherein the layer of polyolefin on the side adjacent to the concrete to be poured, pouring concrete into the form, allowing the concrete to cure and then removing the form from the cured concrete.

It is an object of this invention to provide a concrete form offering superior performance and which may be re-used many times.

It is also an object of this invention to provide a method for producing a panel for re-usable cement forms in a one-step process.

Other objects of the present invention will in part be obvious and in part be pointed out hereafter.

DETAILED DESCRIPTION OF THE PREFERRED EMBODIMENTS

The copolyester of the present invention is an amorphous or semi-crystallizable copolyester containing repeat units from at least 90 mole percent terephthalic acid, 20 to 40 mole percent diethylene glycol, and 80 to 60 mole percent ethylene glycol, based on 100 mole percent dicarboxylic acid and 100 mole percent diol. The dicarboxylic acid component of the copolyester may optionally be modified with up to 10 mole percent of one or more different dicarboxylic acids other than terephthalic acid, or suitable synthetic equivalents such as dimethyl terephthalate. Such additional dicarboxylic acids include aromatic dicarboxylic acids preferably having 8 to 14 carbon atoms, aliphatic dicarboxylic acids preferably having 4 to 12 carbon atoms, or cycloaliphatic dicarboxylic acids preferably having 8 to 12 carbon atoms. Examples of dicarboxylic acids to be included with terephthalic acid are: phthalic acid, isophthalic acid, naphthalene-2,6-dicarboxylic acid, cyclohexanedicarboxylic acid, cyclohexanediacetic acid, diphenyl-4,4'-dicarboxylic acid, succinic acid, glutaric acid, adipic acid, azelaic acid, sebacic acid, and the like. Copolyesters may be prepared from one or more of the above dicarboxylic acids.

It should be understood that use of the corresponding acid anhydrides, esters, and acid chlorides of these acids is included in the term "dicarboxylic acid".

In addition, the copolyester may optionally be modified with up to 5 mole percent, of one or more different diols other than ethylene glycol and diethylene glycol. Such additional diols include cycloaliphatic diols preferably having 6 to 20 carbon atoms or aliphatic diols preferably having 3 to 20 carbon atoms. Examples of such diols to be included with ethylene glycol and diethylene glycol are: triethylene glycol, 1,4-cyclohexanedimethanol, propane-1,3-diol, butane-1,4-diol, pentane-1,5-diol, hexane-1,6-diol, 3-methylpentanediol-(2,4), 2-methylpentanediol-(1,4), 2,2,4-trimethylpentane-diol-(1,3), 2-ethylhexane-diol-(1,3), 2,2-diethylpropane-diol-(1,3), hexanediol-(1,3), 1,4-di-(hydroxyethoxy)-benzene, 2,2-bis-(4-hydroxycyclohexyl)-propane, 2,4-dihydroxy-1,1,3,3-tetramethyl-cyclobutane, 2,2-bis-(3-hydroxyethoxyphenyl)-propane, and 2,2-bis-(4-hydroxypropoxyphenyl)propane. Copolyesters may be prepared from two or more of the above diols.

The copolyester has an inherent viscosity of 0.4 to 1.5 dl/g, preferably 0.5 to 0.9 dl/g. Copolyesters containing substantially only diethylene glycol, ethylene glycol and terephthalic acid are preferred. Preferably, the diol portion of the copolyester contains 32 to 40 mole percent diethylene glycol and 68 to 60 mole percent ethylene glycol.

If the diethylene glycol content is less than 20 mole percent, the melting point of the copolyester is too high to be reactivated by thermocompressing at 400° F. If the diethylene glycol content is greater than 40 mole percent, the glass transition temperature is too low, making the copolyesters difficult to handle in bulk and coated form.

The copolyesters of the present invention can be prepared by conventional polycondensation procedures well-known in the art. Such processes include direct condensation of the dicarboxylic acid(s) with the diols or by ester interchange using a dialkyl dicarboxylate. For example, dimethyl terephthalate is ester interchanged with the diols at elevated temperatures in the presence of a catalyst. Typical polyesterification catalysts which may be used include titanium alkoxides, dibutyl tin dilaurate, and combinations of zinc, manganese or magnesium acetates or benzoates with antimony oxide or antimony triacetate. The copolyesters may also be subjected to solid state polymerization methods.

The polyolefins useful according to the present invention are mainly polymers of ethylene, propylene, or other lower alpha-olefins.

As far as the polyethylenes are concerned, they may be a homopolymer of ethylene or copolymers thereof with other monomers such as butene-1 or vinyl acetate, an ionomer or any other polymer of ethylene which has been modified by treatments such as cross-linking. All such polymers must, however, be solid to be useful and preferably have a density in excess of 0.90 g/cc. By the term "solid", it is meant that the polyolefin should be classified as a solid under ambient temperature and pressure conditions.

Many other ingredients can be added to the copolyesters of the present invention to enhance the performance properties of the copolyesters. For example, antioxidants, denesting agents, antiblocking agents, metal deactivators, colorants, phosphate stabilizers, mold release agents, fillers such as talc and formica, silica, glass beads, glass fibers, nucleating agents, ultraviolet light and heat stabilizers, lubricants, flame retardants and the like, can be included herein. All of these additives and the use thereof are well known in the art. Any of these compounds can be used as long as they do not deleteriously effect the physical, mechanical, or adhesive properties of the copolyesters.

The layer of polyolefin and the layer of copolyester may be aided by the introduction of a "tie layer" between the layer of polyolefin and the copolyester of the invention. In other words, a three layer coextrusion is preferred where the layers are: polyolefin, tie layer, and the copolyester of the invention, respectively. The tie layer should act as an adhesive to tie the polyolefin layer to the layer containing the copolyester of the invention. The tie layer comprises any material that exhibits adhesive properties that is extrudable into a film. Examples of useful materials for the tie layer are functionalized polyolefins such as: ionomer/ethylene copolymer, vinyl acetate/ethylene copolymer, methacrylic acid/ethylene copolymer, methyl acrylate/ethylene copolymer, anhydride/acrylate/ethylene terpolymer, and the likes.

The thermoplastic film of the present invention is laminated to a wooden substrate under heat and pressure or optionally by radio frequency energy. The thermoplastic film may consist of multilayers and multimaterials. The film may be a coextrusion or lamination of thermoplastics. It is preferable that the layer of copolyester and polyolefin, and if applicable, the tie layer, be effected by coextrusion of these prior art methods, coextrusion methods known in the art, either by simultaneous coextrusion of the respective film-forming layers through independent orifices of a multi-orifice die, and thereafter uniting the still molten layers, or by single-channel coextrusion in which molten streams of the respective polymers are first united within a channel leading to a die manifold, and thereafter extruded together from the die orifice under conditions of streamline flow without intermixing thereby to produce a film are preferred.

Any wooden surface of a panel is normally adapted to receive the coextruded layer of polyolefin and copolyester, according to the present invention. It is, however, desirable that the wooden surface be substantially plane. Even though it is not necessary, it may be advantageous to apply a coating of primer composition to the wooden surface prior to applying the coextruded layer of polyolefin and copolyester; the hardness characteristics of the wood may be improved and also the adhesion between the wood and the coextruded layer of and copolyester, the latter especially if an adhesion promoter is present in the coextruded layer of polyolefin and copolyester.

Primer compositions which may be applied to the wooden surface include commercially available wood primers such as urethane- or epoxy- containing compositions.

The panels of the present invention may be made of any material provided that one surface thereof consists of wood or other cellulosic material such as particle board. Contemplated within the scope of the invention are laminates, including those containing layers of metals (e.g. aluminum foil) having a surface ply or veneer of wood. Preferred are panels of plywood such as plywood made from Douglas fir.

Soft plywoods find wide application as concrete boards because they usually are the most inexpensive type. Nevertheless, the more expensive hardwood plywoods may also used according to the present invention as may any other form of lumber, fiberboard, or hardboard for providing the wood substrate to which the coextruded layer of polyolefin and copolyester may be bonded.

The coextruded layer of polyolefin and copolyester may be applied to the wooden panel in any of a number of ways. Frequently, it will be useful to place a film of copolyester/polyolefin or copolyester/polyolefin/tie layer on the wooden surface and to subject the exposed surface of the film to a pressure of between 0 psig and 1,000 psig while simultaneously heating the film to between 200° F. and 500° F.

It will, however, be readily understood that pressure conditions useful for coating the wooden panel are interrelated to the prevailing temperature and the period of time elapsed while subjecting the coextruded layer of polyolefin and copolyester to pressure. Higher temperatures and pressures and longer periods of time tend to increase the penetration of the extruded layer of the solid polyolefin and the copolyester into the wood. Thus, advantageous conditions for practicing the process of the present invention may be found with the combination of 300° F., 200 psi and 1 minute.

Pressure, and if desired, heat treatment may be effected with heated presses of the types commercially available or by passing the wooden form board covered with a film of polyolefin copolyester through heated rollers under pressure. Since some polyolefins tend to adhere to the surfaces of the presses or rollers, it may be desirable to coat such surfaces with a suitable release agent.

Other methods of applying the layer of polyolefin to the wooden surface include such processes as extrusion coating, solution coating, dispersion coating, powder coating, or fluidized bed coating. Solution coating and dispersion coating procedures are advantageous for applying ethylene/vinyl acetate copolymers to the wooden surface, and ionomer resins, too, may frequently be applied by a dispersion coating procedure.

It is preferred that the coextruded layer of polyolefin and copolyester coated on the wooden surface be derived from film, although the layer may also be derived from other sources of copolyester and polyolefin, such as sheets, pellets, powders or liquids.

The efficiency of the wooden panels used according to the method of the invention will depend on the thickness of the coextruded layer of polyolefin and copolyester applied.

The sheet of film may conveniently range in thickness from 0.1 to 15 mils. A thickness of from about 2 to about 15 mils would normally be preferred. Under normal conditions of use, a thickness of 3.0 mil is contemplated.

As the density increases, better abrasion resistance is obtained.

For some applications, it is advantageous to incorporate certain adhesion promoters in the polyolefin. Suitable such promoters include unsaturated carboxylic acids and, in particular, unsaturated dicarboxylic acids such as fumaric acid, and anhydrides, esters and salts thereof.

This invention can be further illustrated by the following examples of preferred embodiments thereof, although it will be understood that these examples are included merely for purposes of illustration and are not intended to limit the scope of the invention unless otherwise specifically indicated. The starting materials are commercially available unless otherwise indicated.

EXAMPLE 1

An overlay consisting of polyethylene/tie layer/copolyester was extruded into film. The polyethylene was cured under radiation to produce crosslinking. The adhesive layer was a copolyester consisting of 100 mol % terephthalic acid and approximately 37 mol % diethylene glycol and 63 mol % ethylene glycol. The copolyester resin had a starting inherent viscosity of 0.77 dL/g. The overlay was pressed onto a sanded yellow poplar plywood core at 250 psi and 250° F. for 3 minutes. The laminated panels were made into boxes with the film overlay facing the interior of the box. Cement was poured into the box, settled, and allowed to cure. The hardened cement was removed from the box with no effort. The laminate remained in excellent condition.

The layer of polyester was 0.75 mils thick. The tie layer was 0.25 mils thick. The material used for the tie layer is believed to consist of an ethylene-based terpolymer and is sold under the name Mitsui Admer AT-469 by Misui & Co. (U.S.A.) Cleveland, Ohio. The layer of polyethylene had a Melt Index of 50 g/10 min. as measured by ASTM Method D 1238 and a density of 0.923 g/cm$^3$ as measured by ASTM Method D 1505.

EXAMPLE 2

The laminate box used in Example 1 using the same film was refilled with cement and the cement allowed to cure. The hardened cement was easily removed from the box and the box wiped clean with a damp cloth. This cycle was repeated for an additional six times. The laminate remained in good condition and was still usable.

EXAMPLE 3

The laminate boards were produced identically to those produced in Example 1 for peel strength testing. The film was a total of 10 mils thick. The film overlays tore before peeling could begin. The bond strengths of the laminate were stronger than the overlay itself. A monolayer polyethylene film could not be bonded to a plywood substrate as claimed in CA 918,896 and CA 931,486 to compare bond strengths.

The invention has been described in detail with particular reference to preferred embodiments thereof, but it will be understood that variations and modifications can be effected within the spirit and scope of the invention. Moreover, all patents, patent applications (published and unpublished, foreign or domestic), literature references or other publications noted above are incorporated herein by reference for any disclosure pertinent to the practice of this invention.

We claim:

1. A panel of material comprising a film comprising a layer of a solid polyolefin and a layer of copolyester wherein said copolyester comprises:

(1) a dicarboxylic acid component comprising repeat units from at least 90 mole percent terephthalic acid; and (2) a diol component comprising repeat units from 20 to 40 mole percent diethylene glycol and 80 to 60 mole percent ethylene glycol, based on 100 mole percent dicarboxylic acid and 100 mole percent diol, said layer of a copolyester being intimately bonded to a wooden substrate and said polyolefin layer being exposed on the outer surface of said film.

2. The panel of material of claim 1 wherein the dicarboxylic acid component of said copolyester is modified with up to 10 mole percent of one or more dicarboxylic acids other than terephthalic acid or suitable synthetic equivalents.

3. The panel of material of claim 2 wherein the dicarboxylic acid used to modify said copolyester is selected from the group consisting of phthalic acid, isophthalic acid, naphthalene-2,6-dicarboxylic acid, cyclohexanedicarboxylic acid, cyclohexanediacetic acid, diphenyl-4,4'-dicarboxylic acid, succinic acid, glutaric acid, adipic acid, azelaic acid, and sebacic acid.

4. The panel of material of claim 1 wherein the diol component of said copolyester is modified with up to 5 mole percent of one or more different diols other than ethylene glycol and diethylene glycol.

5. The panel of material of claim 4 wherein the diol used to modify said copolyester is selected from the group consisting of triethylene glycol, 1,4-cyclohexanedimethanol, propane-1,3-diol, butane-1,4-diol, pentane-1,5-diol, hexane-1,6-diol, 3-methylpentanediol-(2,4), 2-methylpentanediol-(1,4), 2,2,4-trimethylpentane-diol-(1,3), 2-ethylhexanediol-(1,3), 2,2-diethylpropane-diol-(1,3), hexanediol-(1,3), 1,4-di-(hydroxyethoxy)-benzene, 2,2-bis-(4- hydroxycyclohexyl)-propane, 2,4-dihydroxy-1,1,3,3-tetramethyl-cyclobutane, 2,2-bis-(3-hydroxyethoxyphenyl)-propane, and 2,2-bis-(4-hydroxypropoxyphenyl)-propane.

6. The panel of material of claim 1 wherein said wooden substrate is a panel of plywood.

7. The panel of material of claim 1 wherein said film comprises an additional layer of an adhesive material in the middle of said polyolefin layer and said layer of copolyester.

8. The panel of material of claim 1 wherein said film incorporates a dispersion of carbon black particles.

9. The panel of material of claim 1 wherein said film has incorporated therein an adhesion promoter.

10. The panel of material of claim 1 wherein said film has a depth of between 1.0 and 15.0 mils.

11. A method for the formation of a concrete structure comprising the steps of erecting and securing a form for said structure, said form consisting essentially of wooden panels coated with a film comprising layer of a solid polyolefin and a layer of a copolyester wherein said polyolefin layer is on the side adjacent to the concrete to be poured, pouring concrete into the form, allowing the concrete to cure and then removing the form from the cured concrete, wherein said copolyester comprises:

(1) a dicarboxylic acid component comprising repeat units from at least 90 mole percent terephthalic acid; and (2) a diol component comprising repeat units from 20 to 40 mole percent diethylene glycol and 80 to 60 mole percent ethylene glycol, based on 100 mole percent dicarboxylic acid and 100 mole percent diol.

12. The method of claim 11 wherein the form consists of a wooden panel coated with said film.

13. The method of claim 12 wherein said wooden panel is coated with said film incorporating a dispersion of carbon black particles.

14. The method of claim 11 wherein said film has a depth of between 1.0 to 15.0 mils.

15. The method of claim 14 wherein said polyolefin has a density of at least 0.90 g/cc.

* * * * *